United States Patent
Kratz et al.

(10) Patent No.: US 9,503,687 B2
(45) Date of Patent: Nov. 22, 2016

(54) PERSONALIZED MEETING EVENT CAPTURE USING EGOCENTRIC TRACKING IN SMART SPACES

(71) Applicant: FUJI XEROX CO., LTD., Tokyo (JP)

(72) Inventors: Sven Kratz, San Jose, CA (US); Jun Shingu, Yokohama (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 14/667,504

(22) Filed: Mar. 24, 2015

(65) Prior Publication Data

US 2016/0286164 A1 Sep. 29, 2016

(51) Int. Cl.
*H04N 7/15* (2006.01)
*G06T 7/00* (2006.01)

(52) U.S. Cl.
CPC .............. *H04N 7/15* (2013.01); *G06T 7/004* (2013.01); *G06T 2207/30204* (2013.01)

(58) Field of Classification Search
USPC ....................................................... 348/14.08
See application file for complete search history.

(56) References Cited

U.S. PATENT DOCUMENTS

| | | | | |
|---|---|---|---|---|
| 2012/0159329 A1* | 6/2012 | Chow | ................. | G11B 27/329 715/716 |
| 2013/0127980 A1* | 5/2013 | Haddick | ................. | G06F 3/013 348/14.08 |
| 2013/0147838 A1* | 6/2013 | Small | ................. | G06F 3/013 345/633 |
| 2013/0204707 A1* | 8/2013 | Ptucha | ................. | G06Q 30/02 705/14.66 |
| 2013/0232263 A1* | 9/2013 | Kelly | ................. | H04L 43/10 709/224 |
| 2014/0088990 A1* | 3/2014 | Nawana | ................. | A61B 19/50 705/2 |
| 2016/0048556 A1* | 2/2016 | Kelly | ................. | G06F 17/30867 707/767 |
| 2016/0227228 A1* | 8/2016 | Pomeroy | ................. | H04N 19/187 375/240.02 |

* cited by examiner

*Primary Examiner* — Creighton Smith
(74) *Attorney, Agent, or Firm* — Morgan, Lewis & Bockius LLP

(57) ABSTRACT

A system to determine viewer attention to presented content. Markers are applied to a presentation. Head orientation information is received from a body mounted camera worn by a viewer and is used to determine a sequence of head orientations of the viewer. The sequence of head orientations is associated with an identifier of the viewer and a corresponding sequence of first time stamps. A sequence of images is captured by the body mounted camera worn by the viewer. The sequence of images is associated with an identifier of the viewer and the body mounted camera and a corresponding sequence of second time stamps. Respective members of the sequences of images and head orientations are associated, and the presentation content is identified by evaluating information from visible markers in the captured sequence of images. Viewer attention to different elements can then be determined.

20 Claims, 9 Drawing Sheets

PERSONALIZED MEETING EVENT CAPTURE USING EGOCENTRIC TRACKING IN SMART SPACES

TECHNICAL FIELD

The present application generally relates to networking in a smart space environment, where devices form connections with each other and more particularly relates to device tracking in smart spaces for user localization.

BACKGROUND

Smart environments have been a popular research topic during the last decade. Smart spaces (also labeled as pervasive computing environments, smart environments, or spaces with ambient intelligence) are technologically augmented work environments that are used by groups of users, who work collaboratively on a task. For instance, a workplace meeting room can be equipped as a smart space to gather metadata about activities taking place there, such as user (e.g., meeting attendee) locations and active speaker detection. The gathered information can provide rich feedback to the user, such as information for later review of the meeting or creating video summaries etc.

Previous work on egocentric tracking in smart spaces has accomplished user localization by instrumenting smart spaces with an extensive array of sensors, such as depth sensors and cameras. However, such conventional methods have limitations, e.g., the scalability to very large rooms and/or the ability to track a large number of participants. In particular, conventional methods often require exponentially more sensors for scalability. Thus, when using conventional methods to track a large crowd, occlusion problems ensue.

SUMMARY

The present disclosure addresses the challenges described above by using egocentric tracking for user localization to enable the personalized capturing of meeting events. Visual identifiers are placed in the environment to enable optical localization of the users (e.g., meeting attendees). Using passive identifiers (vs. active sensors used in conventional systems) for tracking users in smart spaces, the advantages of systems according to some implementations include scalability in the dimensions of the tracking space and the number of users who can be tracked in the smart space. Systems in accordance with some implementations allow measurement of a number of events relevant to meeting capture and archival systems, including user localization, user authentication, speaker detection, conversation metrics and personalized measurement of viewing activity.

Recent technological advances have made lightweight, head mounted cameras both practical and affordable, and products like Google Glass have attempted to bring the idea of egocentric (first-person) tracking to the mainstream. During egocentric tracking, objects that the observer manipulates or people and faces that the observer interacts with, tend to naturally be centered in the view and are less likely to be occluded. Therefore, the information captured by egocentric tracking may be helpful for specific applications, such as user localization.

The present disclosure proposes a technique to facilitate the generation and measurement of personalized meeting events through egocentric localization. As used herein, the terms, "egocentric localization," "egocentric user localization," "user localization," or "localization" refer to the operations of capturing the visual information from a person's field-of-view in a given environment, and using this captured information (e.g., location and head orientation information of the person) to determine what the person is attending to (e.g., looking at). In some implementations, egocentric localization is accomplished using a combination of visual markers and camera-equipped head-mounted devices (HMDs). In some implementations, the method relies on users wearing HMDs that are equipped with cameras. In some implementations, tracking is performed egocentrically from the perspective of the user. The advent of lightweight HMDs that are equipped with a camera and inertial measurement unit (IMU) (e.g., Google Glass) makes this possible.

In order to make camera-based localization possible in this way, external visual markers are relied upon in the smart space. Visual markers, also referred to as markers herein, are widely used in Augmented Reality (AR) systems. Augmented reality (AR) technology combines the virtual and the real worlds together to provide the viewers with enhanced views of the environment. An AR system, for example, can include a display and a motion tracker with associated software. The software reads the tracking events to know the location of the display and renders the virtual objects. In order to render correctly, the virtual objects and the real world need to be registered. This registration implies that the geometry of the virtual camera where the augmentation takes place is known with respect to the real world. Visual markers can be used in AR systems for motion tracking, location, and/or pose estimation, among others.

In some implementations, the external visual markers or markers can either be displayed on the smart space's monitors (if so equipped) or be part of the décor (e.g., attached to walls, displays, screens, furniture, etc), in accordance with some implementations. There are a number of visual marker schemes that can be used to provide logical as well as geometry information (e.g., marker scale, pitch, roll and yaw as well as center and corner point location in 2D camera image) of the marker. In some implementations, even if line-of-sight to any marker in the smart space is lost (this is possible, e.g., due to occlusion or an unusual head attitude), localization can still be performed by dead reckoning on the HMD's IMU for a certain amount of time, until a new marker has been detected. For example, the HMD's IMU can capture the visual information from a viewer's first-person field-of-view in the smart spaces, and combine the data from accelerometer and gyroscope, step counting, and/or information obtained using techniques known in the art to determine what the viewer is attending to (e.g., looking at).

As used herein, the term "occlusion" means that there is something a user wants to see, but cannot due to some property of the sensor setup, or some event. For example, in a system that tracks objects (e.g., people, cars etc.), occlusion occurs if an object the system tracks is hidden (occluded) by another object, such as two persons walking past each other, or a car that drives under a bridge etc. In another example, when using a range camera (e.g., a camera that provides images that show distances to respective points in a scene), occlusion can occur in areas where the range camera cannot collect any information. In another example, some laser range cameras work by transmitting a laser beam onto the surface the user is examining and then having a camera identify the point of impact of that laser in the resulting image. However, since the camera and laser are not necessarily aligned, some points on the examined surface are occluded, namely, hidden from the camera, or located within the camera field of view but laser cannot hit.

To infer the user's location in smart space, systems in accordance with some implementations leverage both the logical and geometry information of the markers. For example, the logical marker information is first used to identify the marker's ID. The marker's ID is then used to query a database that includes the marker's location and dimensions in smart space. In conjunction with the logical information, the geometry information provided by the marker detection algorithm can be used to infer the user's location in space. In some implementations, a system used for the marker detection algorithm is Embedded Media Marker (EMM) system by Fuji Xerox Co., LTD. Other marker detection systems known in the art, such as visual fidicial codes of QR detection, invariant image features detection of SIFT, SURF etc. can also be used in accordance with some implementations. It should be noted that multiple detected markers can be used to improve localization by averaging the inferred user location in accordance with some implementations. In addition to querying the server for marker's location inference, systems in accordance with some implementations are able to infer the user's head orientation by making use of the HMD's IMU.

Thus, methods and systems in accordance with implementations solve the problem of user localization through an egocentric approach. This approach has at least the following advantages: (1) the method can scale up to arbitrary space sizes, assuming that visual markers can be placed in the smart space, and (2) the method can scale with the number of users using the space, especially when each user is equipped with an appropriate HMD.

In accordance with some implementations, a method to determine viewer attention to presented content is performed at a computer system with a processor and a memory. The method includes: applying first markers to a first set of content to be presented to a plurality of viewers, wherein each of the first markers includes first metadata that identifies at least a content ID associated with the first set of content and a respective presentation unit of a presentation; displaying the presentation on the presentation unit to the plurality of viewers with the applied first markers; receiving head orientation information from a body mounted camera worn by a first viewer of a plurality of viewers and determining from the head orientation information a sequence of head orientations of the first viewer and associating each of the sequence of head orientations with an identifier associated with the first viewer and a corresponding sequence of first time stamps; receiving a sequence of images captured by the body mounted camera worn by the first viewer, wherein the sequence of images are of in-room visuals/information presented to and viewable by the first viewer, and to associate the sequence of images with an identifier associated with the first viewer and the body mounted camera and a corresponding sequence of second time stamps; storing and associating respective members of the sequence of images and the sequence of head orientations; identifying presentation content by evaluating the metadata of a marker in the captured sequence of images; and measuring viewing activities of the first viewer, wherein the viewing activity measurements include when the first viewer is or is not attending to the displayed content.

In some implementations, the first markers include physical markers to identify presentation surfaces of the presentation where the presentation is presented, wherein the presentation includes non-digital content and/or digital content.

In accordance with some implementations, the presentation with virtual markers embedded is displayed concurrently on personal screens as well as presentation screens.

In accordance with some implementations, receiving a sequence of images includes: receiving the sequence of images captured by two or more body mounted cameras worn by two or more of the plurality of viewers.

In accordance with some implementations, the method further includes: receiving in-room audio recorded by a microphone coupled to the body mounted camera, wherein the in-room audio includes audio from the first set of content presented and audio from speakers in the room, and the in-room audio is associated with the first viewer.

In accordance with some implementations, the method further includes: identifying which viewer of the plurality of viewers is speaking based on which microphone coupled to the body mounted camera has the strongest audio signal at any given point in time.

In accordance with some implementations, the method further includes using voice fingerprinting to verify the identity of a speaker of the plurality of viewers.

In accordance with some implementations, the method further includes: based on the viewing activities of the plurality of viewers, identifying a subset of the plurality of viewers, wherein members of the subset of the plurality of viewers are conversing with each other at a given moment of time, and identifies dominant or passive speakers in the subset of the plurality of viewers.

In accordance with some implementations, the method further includes: preparing a report on overall audience interest and on individual interest in the presentation.

In accordance with some implementations, the method further includes: based on the viewing activities stored at the server, sends additional content relevant to a viewer for display on one or more devices associated with the viewer.

In accordance with some implementations, the measurements are taken by computing a difference between the sequence of head orientations and a relative position of the identified content in the sequence of images and determining that the first viewer is attending to the identified content when the two directions are within a predefined angular difference at approximately the same time based on the associated first and second timestamps.

In accordance with some implementations, a system to determine viewer attention to presented content includes: a virtual labeling module for applying first markers to a first set of content to be presented to a plurality of viewers, wherein each of the first markers includes first metadata that identifies at least a content ID associated with the first set of content and a respective presentation unit of a presentation; a display module for displaying the presentation on the presentation unit to the plurality of viewers with the applied first markers; a head orientation determining module for receiving head orientation information from a body mounted camera worn by a first viewer of a plurality of viewers and determining from the head orientation information a sequence of head orientations of the first viewer and associating each of the sequence of head orientations with an identifier associated with the first viewer and a corresponding sequence of first time stamps; an image receiving module to receive a sequence of images captured by the body mounted camera worn by the first viewer, wherein the sequence of images are of in-room visuals/information presented to and viewable by the first viewer, and to associate the sequence of images with an identifier associated with the first viewer and the body mounted camera and a corresponding sequence of second time stamps; a data integration module for storing and associating respective members of the sequence of images and the sequence of head orientations; a content identification model for identifying presentation content by evaluating the metadata of a marker in the captured sequence of images; and a viewer attention determining module for measuring viewing activities of the first viewer, wherein the viewing activity measurements include when the first viewer is or is not attending to the displayed content.

In accordance with some implementations, a non-transitory computer readable storage medium stores one or more programs to be executed by a computer system with memory, and one or more processors. The one or more programs include: instructions for applying first markers to a first set of content to be presented to a plurality of viewers, wherein each of the first markers includes first metadata that identifies at least a content ID associated with the first set of content and a respective presentation unit of a presentation; instructions for displaying the presentation on the presentation unit to the plurality of viewers with the applied first markers; instructions for receiving head orientation information from a body mounted camera worn by a first viewer of a plurality of viewers and determining from the head orientation information a sequence of head orientations of the first viewer and associating each of the sequence of head orientations with an identifier associated with the first viewer and a corresponding sequence of first time stamps; instructions for receiving a sequence of images captured by the body mounted camera worn by the first viewer, wherein the sequence of images are of in-room visuals/information presented to and viewable by the first viewer, and to associate the sequence of images with an identifier associated with the first viewer and the body mounted camera and a corresponding sequence of second time stamps; instructions for storing and associating respective members of the sequence of images and the sequence of head orientations; instructions for identifying presentation content by evaluating the metadata of a marker in the captured sequence of images; and instructions for measuring viewing activities of the first viewer, wherein the viewing activity measurements include when the first viewer is or is not attending to the displayed content.

BRIEF DESCRIPTION OF THE DRAWINGS

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
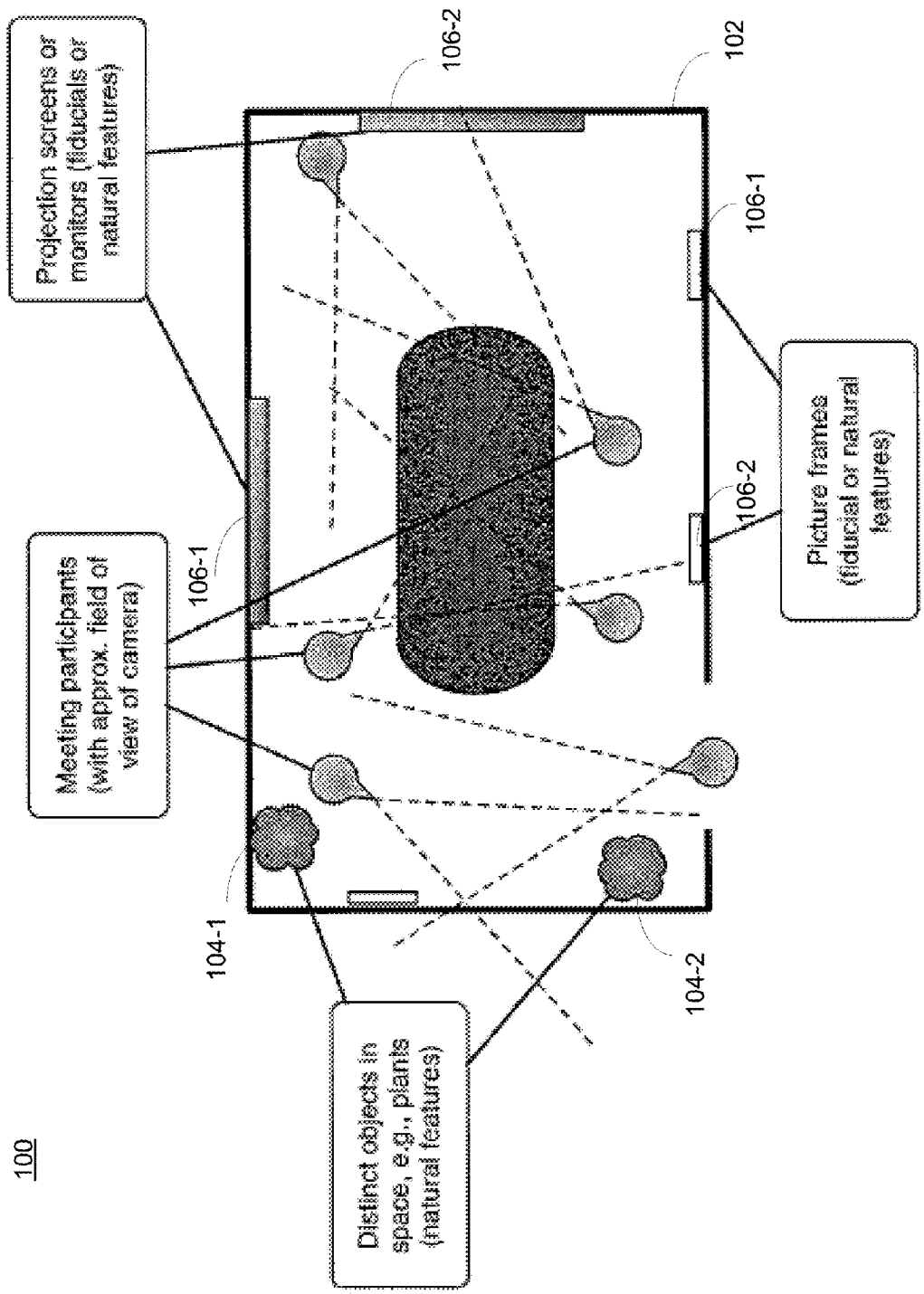
FIG. 1 illustrates an example egocentric tracking system in a smart space in accordance with some implementations.

FIG. 1 is an example egocentric tracking system 100 in a smart space 102 in accordance with some implementations. The system 100 is equipped for egocentric tracking of visual markers including fiducials and/or natural features. As used herein, a "fiducial marker" or "fiducial" is an object placed in the field of view of an imaging system. The object appears in the image produced for use as a point of reference or a measure. It can be something placed into or on the imaging subject (e.g., a sticker with a QR code, barcode, or legible label that identifies the subject), or a mark or a set of marks in the reticle of an optical instrument, among others. As further used herein, natural features employed as visual markers can be decorations, such as paintings or other decorative objects.

For example, in the conference room smart space 102, there are a number of meeting participants with approximate field of view of cameras as indicated by dotted lines. Plants 104 are natural features that are decorative and can be placed in the conference room space 102 for egocentric tracking by the participants' worn cameras. Projection screens and/or monitors 106, and/or picture frames 108, whether they are fiducial or natural features, can be placed in the field of view of the cameras and detected for egocentric tracking. It should be noted that the visual markers in the room can be placed in such a way that there are almost no blind spots in the participants tracking cameras' field of view.

Figure 2:
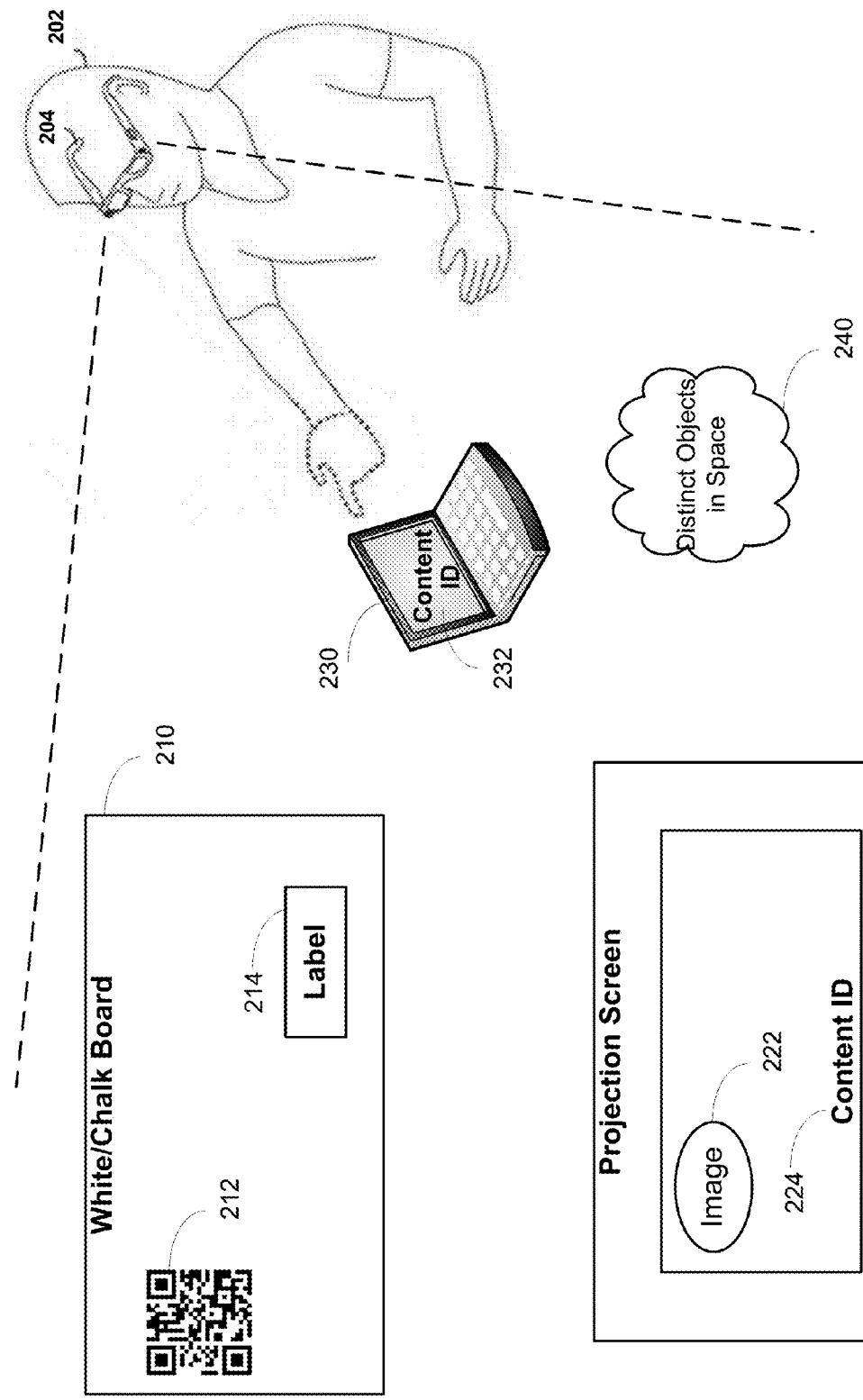
FIG. 2 illustrates examples of visual markers in a smart space that are used by an example egocentric tracking system in accordance with some implementations.

FIG. 2 illustrates more examples of visual markers and illustrate placing these exemplary visual markers in such a way that there are almost no blind spots in a user 202 tracking camera's 204 field of view, in accordance with some implementations. In FIG. 2, visual markers include natural features, such as distinct objects in space 240, monitor 230, white/chalk board 210, QR code 212, or label 214, as well as fiducials markers, such as image 222, content ID (e.g., screen ID) 224, or content ID (e.g., slide ID) 232, among others. These markers, such as a square shaped visual marker 212 affixed on the white or chalkboard 210 can provide at least 4 co-planar corresponding points for the camera 204. Similarly, other shapes, such as the circular marker 222 (e.g., an image displayed on a projection screen 220) or the rectangular shaped marker 214 can also provide a reference point for the camera 204 for location estimation.

Though FIG. 2 shown QR code 212 as an example of a visual marker, visual markers can be of other shape and/or format calculated over the content. In some implementations, a visual marker can be the screen itself or text and/or image encoded based on the screen. Similarly, the label 214, image 222, screen ID 224, and/or slide ID 232, used for identifying content can be of other shape and/or format.

In some implementations, each of the markers (e.g., markers 212, 214, 222, 224 232, and 240) includes metadata that identifies at least a content ID associated with a set of content and a respective presentation unit (e.g., page or frame/video time mark) of a presentation. For example, the screen ID 224 displayed on the projection screen 220 includes metadata that identifies at least a content ID (e.g., frame/video time mark) associated with a set of content displayed on the projection screen 220 (e.g., a set of presentation slides) and the projection screen 220 as the presentation unit. The metadata reflects markers within the set of content when presented on the projection screen 220. Similarly, the slide ID 232 displayed on a monitor 230 includes metadata that identifies at least a content ID (e.g., frame/video time mark) associated with a set of content displayed on the monitor 230 (e.g., projection screen 220 (e.g., a set of presentation slides) with the monitor 230 as the presentation unit. The metadata reflects markers within the set of content when presented on the monitor 230.

In FIG. 2, visual markers 212, 214, 222, 224, 232, and 240 are placed in such a way that there are almost no blind spots in the user 202 tracking camera's 204 field of view. In some implementations, even if blind spots occur possibly due to occlusion or an unusual head attitude, localization can still be performed by, e.g., dead reckoning on the HDM's IMU for a certain amount of time, until a new marker has been detected.

Figure 3:
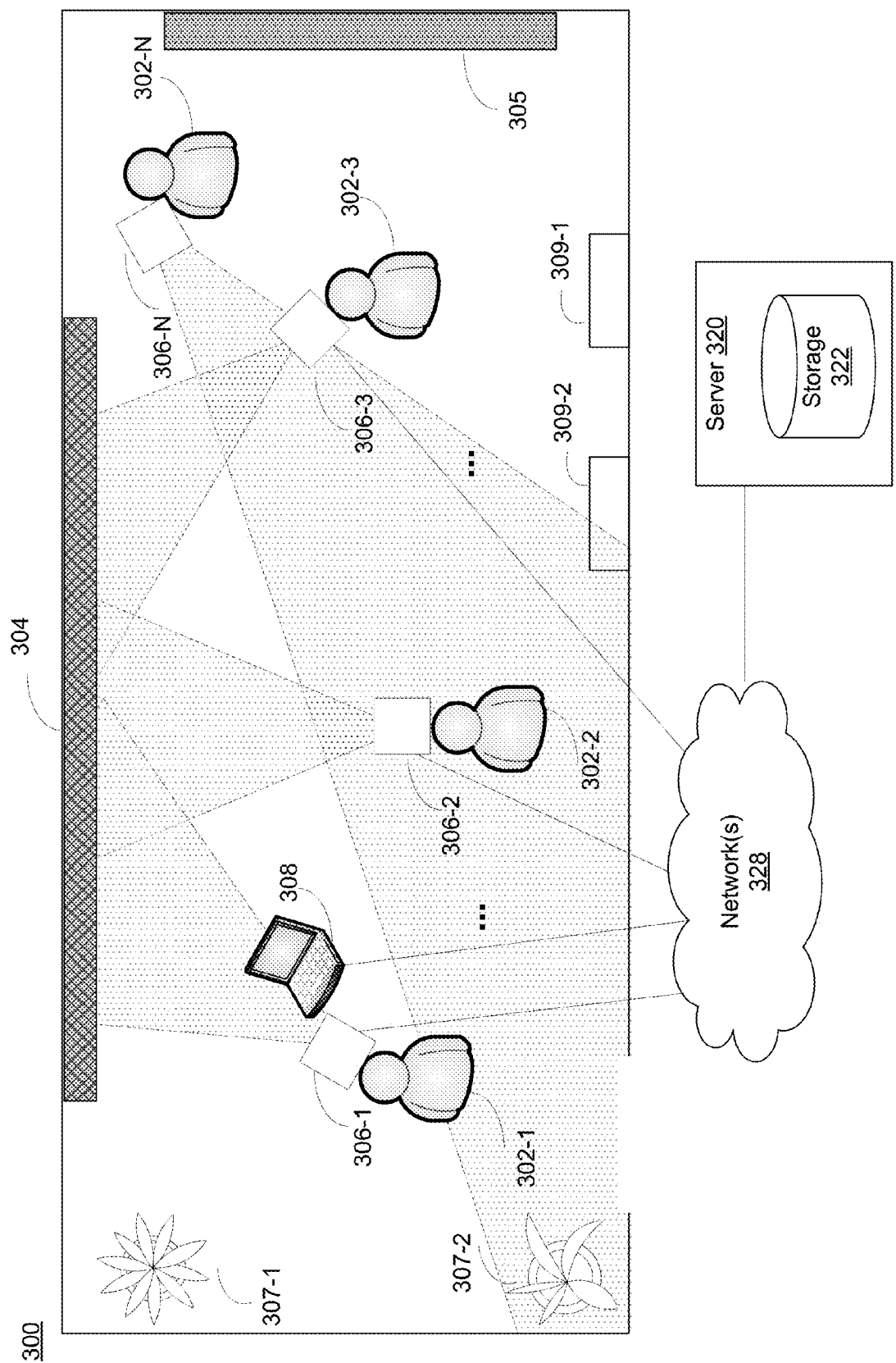
FIG. 3 illustrates another example egocentric tracking system in a smart space in accordance with some implementations.

FIG. 3 is a block diagram of an egocentric tracking system 300 in a smart space. The egocentric tracking system 300 can be used to personalize meeting event, in accordance with some implementations. The system 300 includes one or more clients devices 106 worn by one or more viewers 302, and a server 320 interconnected by one or more communication network(s) 328. In some implementations, the system 300 also includes a computing device 308 that can be used to present content. The computing device 108 is also connected to the client devices 306 and/or the server 320 via the communication network(s) 328.

The communication network(s) 328 can be any wired or wireless local area network (LAN) and/or wide area network (WAN), such as an intranet, an extranet, or the Internet. It is sufficient that the communication network 328 provides communication capability between the server system 320 and the client devices 306, and the device 308.

In the exemplary egocentric tracking system 300, a presenter (e.g., the user 302-N) is presenting content displayed on a projection screen 304 to a group of viewers (e.g., the users 302-1, 302-2, and 302-3). While presenting, the presenter (e.g., the user 302-N) can also refer to content written on a white/chalk board 305. As described above with respect to FIGS. 1-2, natural features, such as plants 307 and fixtures 309, the projection screen 304, the white/chalk board 305 along with QR codes or labels affixed to the smart space can be used as visual markers. In addition, as well as fiducials markers, such as image, screen ID, or slide ID, embedded in the presentation displayed on the computing device 308 and/or the projection screen 304 can also be used as visual markers, among others. These markers can provide reference points for the client devices 106 worn by the one or more viewers 302 for the viewers' 302 location estimation in the smart space.

One or more viewers (e.g., the users 302-1, 302-2, and 302-3) is viewing the content displayed on the projection screen 304 and/or the computing device 308 and/or the white/chalk board 305, such as image, screen ID, slide ID, QR codes, or labels. Each of the users 302 has a field of view 104 (e.g., the local user's eyes), and each of the client devices 306 has a field of view. In some implementations, the client device 306 is worn or carried by the user 302 so that the fields of view of the user 302 and the client device 306 at least partially intersect and are directed toward substantially the same direction. For example, the client device 306 may be head mounted to the user 302. In these implementations, the absolute location of the client device 306 changes as the user 302 moves, but the location and distance of the client device 306 relative to the user 302 remains the same. Other methods of maintaining the same distance relative to the user 302 is possible (e.g., mounted on a cart or other wheeled platform propelled by the user 302).

In some implementations, the client devices 306 include at least one image capture device with connectivity to the networks 328 and, optionally, one or more additional sensors (e.g., Global Positioning System (GPS) receiver, accelerometer, gyroscope, magnetometer, etc.) that enable the location and/or orientation and field of view of the client device 306 to be determined. In some implementations, the client devices 306 also includes a microphone and other sensors (e.g., thermometer, altimeter, barometer, etc.) to provide additional telepresence information to the users 302. As a result, the client devices 306 can provide audio and/or video, directional, and other environmental information for meetings, presentations, tours, and musical or theater performances, etc. for localization.

In some implementations, the client devices 306 include at least one a sensory device. The sensory device includes one or more sensors that, when calibrated to the users' 302 head location and direction of view, outputs data that can be used to determine the users' field of view (including direction and angular extent of view). The sensory device includes connectivity to the networks 328.

In some implementations, the client device 306 includes a camera device, output data from which can also be used to determine the user's field of view. In some implementations, the client device 306 includes a display device that displays information to the user 302. In some implementations, the client device 306 is wearable headgear with sensors, a camera device, and/or a head-up display or head-mounted display or some other display. Examples, without limitation, of the client devices 306 include Google Glass by Google Inc.

The client devices 306 exchange data through the server 320. In some implementations, the client device 306 sends image data, sensor data, and/or metadata to the server system 320. The client devices 306 and server 320 are connected, communicatively coupled through the networks 328. In some implementations, the server system 320 includes modules (further described below with reference to FIG. 5) for coordinating the data exchange and relay between the client devices 306. Thus, the client devices 306 are connect to the server system 320 through the networks 328, and send data to and receive data from each other through the server system 320.

The server 320 receives the image data, sensor data, and/or metadata from the client device 306. In some implementations, the server 320 processes these data to identify the markers, e.g., the projection screen 304, computing device 308, white/chalk board 305, plants 307, fixtures 309, image, screen ID, slide ID, QR codes, or and/or labels, among others. The server 320 further identifies the marker locations and infers the client device's 306 location and orientation. In some implementations, using the location and orientation information, the server 320 determines if the users 302 are paying attention to the content presented and locations of content correspond to the users' attention. The attention information can then be used to personalize meeting events.

Figure 4:
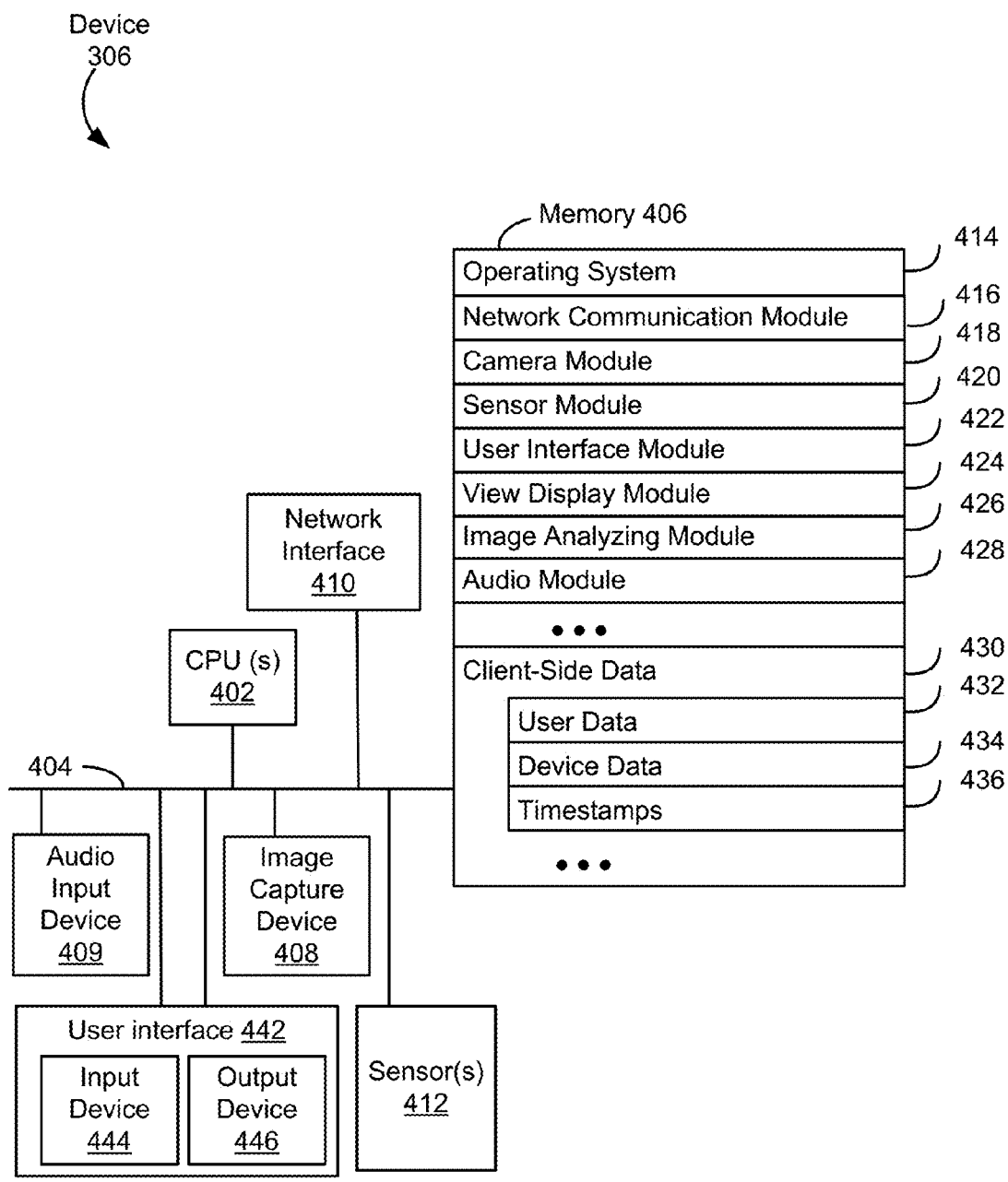
FIG. 4 is a block diagram of an example client device used in an example egocentric tracking system in accordance with some implementations.

FIG. 4 is a block diagram illustrating a representative client device 306 in accordance with some implementations. A client device 306 typically includes one or more processing units (CPUs) 402, one or more network interfaces 410, memory 406, a user interface 442, and one or more communication buses 404 for interconnecting these components (sometimes called a chipset). The user interface 442 includes one or more output devices 446 that enable presentation of media content, including one or more speakers and/or one or more visual displays. The user interface 442 also includes one or more input devices 444, including user interface components that facilitate user input such as a keyboard, a mouse, a voice-command input unit or microphone, a touch screen display, a touch-sensitive input pad, a camera (e.g., for scanning an encoded image), a gesture capturing camera, or other input buttons or controls. Furthermore, some client devices 306 use a microphone and voice recognition or a camera and gesture recognition to supplement or replace the keyboard.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

- an operating system 414 including procedures for handling various basic system services and for performing hardware dependent tasks;
- a network communication module 416 for connecting client device 306 to other computing devices (e.g., server system 320 and the computing device 308) connected to one or more networks 328 via one or more network interfaces 410 (wired or wireless);
- a camera module 420 for receiving and processing a sequenced of images (e.g., still images and/or frames of videos) captured by the image capture device 408, and encoding the captured images into image data, and transmitting the image data to the server system 320;
- a sensor module 420 for obtaining readings from the sensors 412, processing the readings into sensor data, and transmits the sensor data to the server system 320;
- a user interface module 422 that processes user inputs received on the input devices 444 and/or the audio input device 409, and instructs the computing device 306 to perform operations (e.g., record images, record sound, playback images, playback sound etc.) The user interface module 422 can also receive control signals from the server system 320) and instructs the computing device 306 to perform operations in accordance with the control signals.
- a view display module 424 receives data (e.g., sensor data from the image capture device 408 and the sensory device 412, or visualization data from the server 320 etc.), processes the data, and displays the data on the output device 446. The view display module 424 also displays a user interface for issuing commands to the computing device 306, and optionally, interacting with the displayed visualizations.
- an image analyzing module 426 for addition image processing, such as identifying markers in the images captured by image capture device 408;
- an audio module 428 for receiving and processing a audio signals captured by the audio input device 409, and encoding the audio signals into audio data, and transmitting the audio data to the server system 320; and
- a client data storage 430 for storing data of a user's association with the client device 306, including, but is not limited to:
  - user data 432 for storing user identification data;
  - device data 434 for storing information of the device 306 worn by the user, such as the device's 306 location, orientation, pitch, tilt, roll, etc.; and
  - timestamps 436 of the viewing activities captured by the device 306 when worn by the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5:
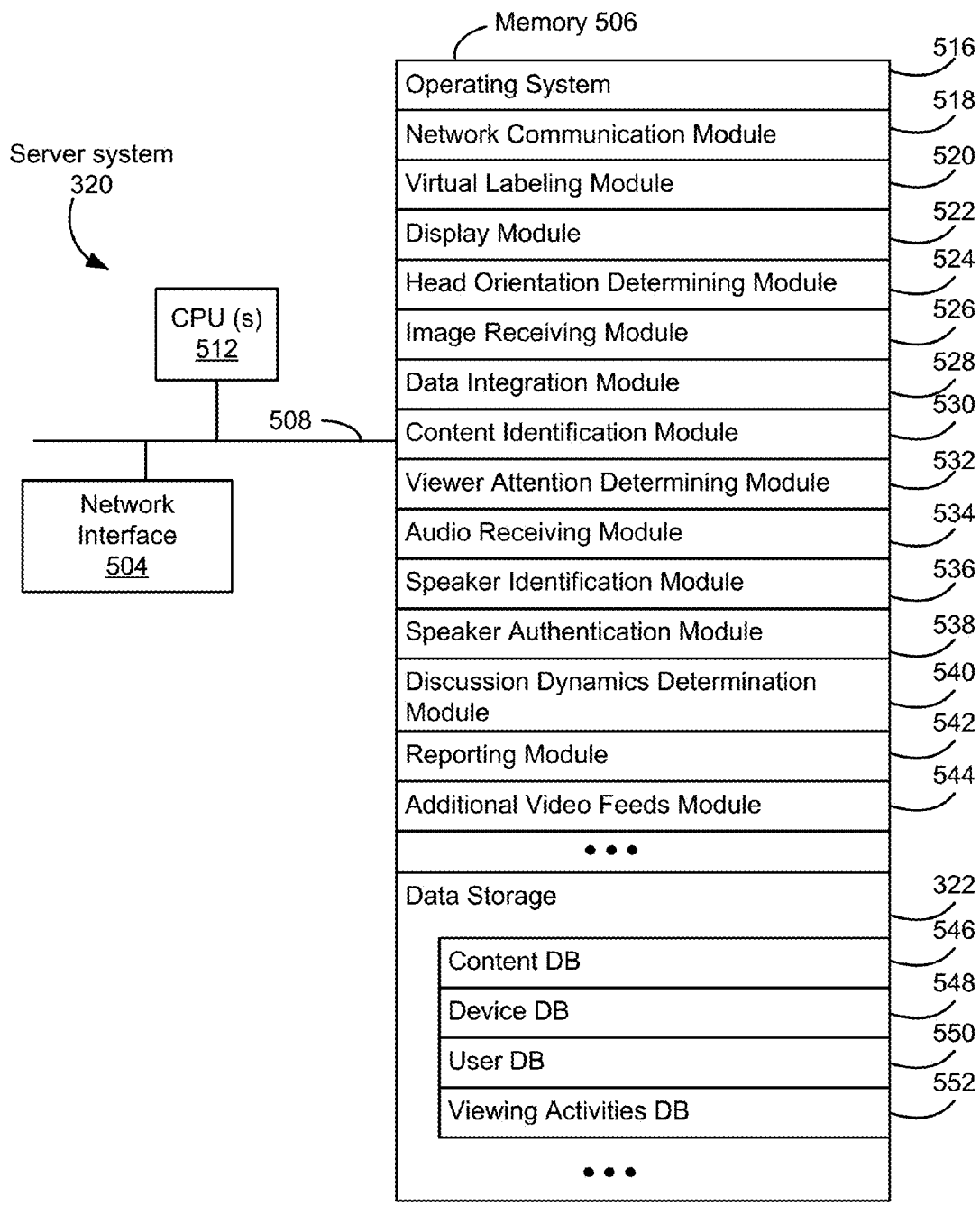
FIG. 5 is a block diagram of an example server system used in an example egocentric tracking system in accordance with some implementations.

FIG. 5 is a block diagram of the server system 320 of FIG. 3 according to some implementations. One or more components of the server system 320 may be accessed or executed from a single computer or from multiple computer devices; other generic components may be included but are not shown in the interest of brevity. The server system 320 generally includes one or more processing units (CPU's) 512, one or more network or other communications interfaces 504, memory 506, and one or more communication buses 508 for interconnecting these components. The communication buses 508 may include circuitry (sometimes called a chipset) that interconnects and controls communications between system components.

Though not shown in FIG. 5, the server system 320 optionally includes a user interface that includes, for instance, a display, input devices and output devices. Input devices can include, for example, a keyboard, a mouse, a touch-sensitive display screen, a touch-pad display screen, or any other appropriate device that allows information to be entered into the server system 320. Output devices can include, for example, a video display unit, a printer, or any other appropriate device capable of providing output data. Note that input devices and output devices can alternatively be a single input/output device.

Memory 506 may include high speed random access memory and may also include non-volatile memory, such as one or more magnetic disk storage devices. Memory 506 may include mass storage that is remotely located from the central processing unit(s) 512. Memory 506, or alternately the non-volatile memory device(s) within memory 506, comprises a computer readable storage medium. Memory 506 stores the following elements, or a subset of these elements, and may also include additional elements:

- an operating system 516 that includes procedures for handling various basic server system services and for performing hardware dependent tasks;
- a communications module 518 that is used for connecting the server system 320 to other servers or computers via one or more communication networks (wired or wireless), such as the Internet, other wide area networks, local area networks, and metropolitan area networks and so on; in some implementations, the communication module 518 is part of a server interface connecting the server 320 to the network 328;

a virtual labeling module 520 for applying visual markers to content to be presented to the viewers 302 in a smart space. In some implementations, each of the visual markers includes metadata that identifies at least a content ID associated with the content and a respective presentation unit (e.g., the projection screens 106-1, 220, 304 and/or the monitors in connection with 230, 308 etc.) of a presentation;

a display module 522 for displaying the presentation on the presentation unit (e.g., the projection screens 106-1, 220, 304 and/or the monitor in connection with 230, 308 etc.) to the viewers 302 with the applied visual markers;

a head orientation determining module 524 for receiving head orientation information from a body mounted camera (e.g., the camera of devices 306) worn by a viewer 302 and determining from the head orientation information a sequence of head orientations of the viewer 302 and associating each of the sequence of head orientations with an identifier associated with the first viewer and a corresponding sequence of first time stamps;

an image receiving module 526 to receive a sequence of images captured by one or more body mounted camera (e.g., the cameras of devices 306) worn by one or more viewers 302. In some implementations, the sequence of images are of in-room visuals/information presented to and viewable by the viewer 302, and to associate the sequence of images with an identifier associated with the viewer 302 and the body mounted camera (e.g., the camera of device 306) and a corresponding sequence of second time stamps;

a data integration module 528 for storing and associating respective members of the sequence of images and the sequence of head orientations;

a content identification model 530 for identifying presentation content by evaluating the metadata of a marker in the captured sequence of images;

a viewer attention determining module 532 for measuring viewing activities of the viewer 302, wherein the viewing activity measurements include when the viewer 302 is or is not attending to the displayed content;

an audio receiving module 534 that receives in-room audio recorded by a microphone (e.g., the audio input device 409) coupled to the body mounted camera (e.g., the camera of device 306); In some implementations, the in-room audio includes audio from the content presented and audio from speakers in the room, and the in-room audio is associated with the viewer 302;

a speaker identification module 536 that identifies which viewer of the in-room viewers 302 is speaking based on which microphone (e.g., the audio input device 409) coupled to the body mounted camera (e.g., the camera of device 306) has the strongest audio signal at any given point in time;

a speaker authentication module 538 that uses voice fingerprinting to verify the identity of a speaker of the in-room viewers 302;

a discussion dynamics determination module 540 that based on the viewing activities of the viewers 302, identifies a subset of the viewers 302, members of the subset of the viewers 302 who are conversing with each other at a given moment of time, and dominant or passive speakers in the subset of the viewers 302;

a reporting module 542 to prepare a report on overall audience interest and on individual interest in the presentation;

an additional video feeds module 544 that, based on the viewing activities stored at the server, sends additional content relevant to an in-room viewer 302 for display on one or more devices associated with the viewer 302, e.g., on the projection screens 106-1, 220, 304 and/or the monitors in connection with 230, 308 etc.; and a data storage component 322 for storing data generated by and used by the above modules, which includes the following databases:

a content database 546, which stores information related to content being presented to the viewers 302, including, but not limited to, content ID, metadata associated with the content. In some implementations, the content ID and/or the metadata can be derived from the content. For example, the QR code 212 can be calculated over the content and used as content ID and/or metadata. In some implementations, the metadata include but not limited to the attributes of the content, such as the shape, location, length, image associated with the content etc.;

a device database 548, which stores information related to the devices; the device database 548 stores information related to both devices used by the viewers 302 to view the presentation and devices worn by the viewers 302 for egocentric tracking, including, but not limited to, a device ID, device location, device orientation, and geometry information;

a user database 550, which stores user information for each of the viewers 302, including, but not limited to, a user ID and the association of the user with a device that is worn by the user for egocentric tracking; and a viewing activities database 552, which stores information related to viewing activities, including, but not limited to, the sequence of images captures by the body mounted camera (e.g., the camera of device 306) worn by the viewer 302, the sequence of head orientations, the timestamps associated with the viewing activities, the viewer identification, the presentation unit identification, the body mounted camera information, the audio, the role of the viewer (e.g., dominant or passive).

In some implementations, by using the information stored in the viewing activities database 552 in conjunction with other information stored in the data storage 322, viewing activities in the smart spaces can be quantified so as to capture information for a personalized meeting event. For example, the viewing activities can be quantified by the number of views using personal displays (e.g., the monitor of the computing device 308), number of views using shared displays (e.g., the monitor of the computing device 308, projection screen 304 and/or white/chalk board 305), total and/or average duration of the viewers, the remote screen (e.g., the projection screen 304 and/or the white/chalk board 305) used for viewing the presentation content, times the viewers talked during the meeting, content IDs viewed in the presentation content, number of times each content identified being viewed, number of times each content identified being viewed on remote (e.g., the projection screen 304 and/or the white/chalk board 305) or personal display (e.g., the monitor of the computing device 308), among others. The quantification can provide insights as to what content is looked at in the event, by which participants, and the duration of the view activities. Using the viewing activities information obtained from the smart spaces, customized content can be generated and provided to the particular group of viewers in the smart spaces.

In some implementations, at least some of the functions of server system 320 are performed by client device 306, and the corresponding sub-modules of these functions may be located within client device 306 rather than at the server system 320. For example, when the client device 306 has sufficient processing capacity, instead of streaming raw image data to the server 320 for analysis, the image analyzing module 426 on the client device 306 can perform image analysis to identify visual markers in the presentation content, the audio module 428 can perform audio analysis to identify speakers, and the sensor module 420 can determining head orientation information and the association of the sequence of head orientations with the viewer and the timestamps, among others.

In some implementations, at least some of the functions of the client device 306 are performed by the server system 320, and the corresponding sub-modules of these functions may be located within server system 320 rather than client device 306. For example, instead of using the sensor module 420 on one client device 306 to collect location and orientation information, the server system 320 can calculate the information based on geometry and location of other objects in the smart spaces. Client device 306 and server system 320 shown in FIGS. 4 and 5, respectively, are merely illustrative, and different configurations of the modules for implementing the functions described herein are possible in various implementations.

Figure 6:
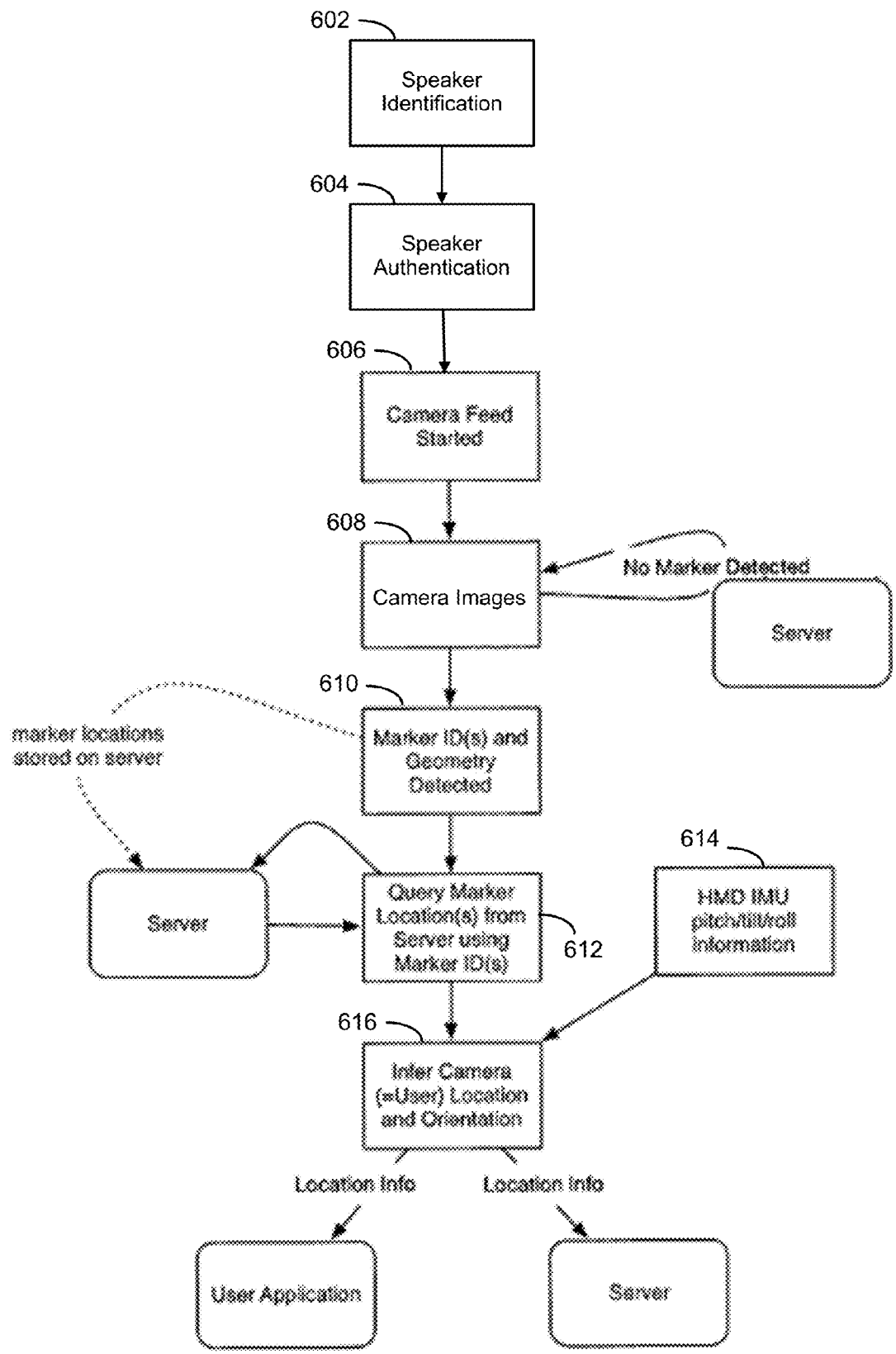
FIG. 6 is a flowchart of an example personalized meeting event capture using egocentric tracking in smart spaces in accordance with some implementations.

FIG. 6 is a flowchart of an example personalized meeting event capture using the egocentric tracking system 300 in smart spaces in accordance with some implementations. In some implementations, when users wear HMDs during meetings, valuable data can be obtained to enable the capture of personalized meeting events according to the method of FIG. 6. For example, details can be captured related to a particular user's location with respect to other users in the presentation space, the presentation screens and in-room boards to which the user does or does not attend during the presentation, and the user's interactions with other users in the presentation space who may or may not be positioned near the user in the space.

In some implementations, the egocentric tracking system 300 tracks identities of the users 302 wearing the client devices 306 (e.g., HMDs). Speaker identification (602) is relatively simple assuming that each user 302 in the smart space is wearing a HMD in accordance with some implementations. Conventional sound localization in artificial systems uses an array of microphones. By using the difference of arrival times of a sound at the two microphones, one can mathematically estimate the direction of the sound source. However, the accuracy of microphone arrays in localization is limited by the physical size of the array. In particular, when the array is too small, the microphones are spaced too closely together so that they all record essentially the same sound, making it extremely difficult to estimate the orientation.

In some implementations, the client device's 306 audio input device 409 (e.g., an on-board microphone) is used to detect speech, e.g., by detecting and measuring the volume amplitude in the appropriate frequency range. When a plurality of users 302 in the smart space are equipped with voice input devices, the egocentric system 300 can track multiple speakers at the same time by analyzing the volume amplitude in the appropriate frequency range. Combining the volume amplitude with other information gathered by the client devices 306, the egocentric tracking system 300 is more precise than conventional methods of speaker identification (e.g., using directional microphone arrays to infer the sound distance and direction from the arrays).

In addition to speaker identification, the egocentric tracking system 300 performs speaker authentication (604). In some implementations, using voice fingerprinting, the egocentric tracking system 300 can verify the identity of the speaker wearing a HMD. This in turns means that the egocentric tracking system 300 can verify the presence of a participant at a meeting, dispensing with the need for a separate authentication system.

Both the speaker identification (602) and speaker authentication (604) operations can be performed on the client device 306 and/or the server 320. For example, when the client device 306 has sufficient processing capacity, the identification (602) and/or authentication (604) can be performed on the client device 306 and the identification and/or authentication result is transmitted to the server 320 via the communication network(s) 328. In another example, when the client device 306 has limited processing capacity and/or battery life, the audio inputs can be obtained by the client device 306 and streamed to the server 306, and the speaker identification (602) and/or speaker authentication (604) can be delegated to the server 320. The server 320 then communicates the identification and/or authentication result to the client device 306 via the communication network(s) 328.

Having identified and authenticated the speaker, the egocentric tracking system 300 starts (606) the image feed by cameras as part of the client device 306. In some implementations, the image feed includes images and/or videos. The camera images (608) captured by the client device 306 include images of the smart space to reflect the user's 302 egocentric field of view as described with respect to FIG. 3 and FIG. 4. In some implementations, the camera images are transmitted to the server 320 via the communication network(s) 328.

Upon receiving the camera images, the server 320 analyzes the images and compare the features of visual markers stored in the data storage 322 with features in the images. If the server 320 does not detect visual markers in the camera images, the server 320 requests more camera images for analysis. On the other hand, if the server 320 detects (610) visual markers in the camera images, the server 320 further identifies logical (e.g., the marker IDs) and geometry (e.g., marker scale, pitch, roll and yaw, center and corner point location in 2D camera image etc.) information of the visual markers from the data storage 322.

In some implementations, the EMM system by Fuji Xerox Co., LTD. can be used for image analysis in order to identify the visual markers. In some implementations, a system using EMM performs feature matching by first periodically sampling (e.g., taking screenshots) and tagging the displayed content with metadata (e.g., application, presentation name, slide number, etc.). The screenshots and metadata are then sent to an EMM server, where it is processed and stored as an EMM together with the metadata in the content database 546. In some implementations, the EMM server is part of the server system 320. On the client side, the camera of the client device 306 periodically takes photos of the smart spaces representing the first-person view of the smart spaces. The photos are sent as queries to the EMM server. If the EMM server detects a stored embedded media marker in the photos by feature matching, it returns the ID of the marker with the associated metadata to complete the image analysis.

In some implementations, other marker detection methods and systems known in the art can also be used in place of or in conjunction with the EMM system for feature matching and marker detection.

As described above with respect to FIG. 5, the features of the visual markers, logical (e.g., the marker IDs) and geometry (e.g. size, dimension, and/or orientation etc.) information, and location are stored in the data storage 322 in accordance with some implementations. Using the logical and geometry information of the visual markers, the egocentric tracking system 300 queries (612) the data storage 322 to obtain the marker location (e.g., using marker IDs). In addition to querying the server for marker's location inference, the egocentric tracking system 300 in accordance with some implementations infers (616) the user's head orientation by making use of the HMD's IMU (614) (e.g., pitch, tilt, roll information). The location information is then stored in the server 320 and communicated to user applications running on the client devices 306.

In some implementations, from location, orientation and the audio channel, the egocentric tracking system can infer discussion dynamics. Subsets of the meeting attendees, who are conversing with each other at a given moment within a timeframe, are identifiable. For instance, a conversation event is logged between two meeting participants if, during a given time interval, their view orientations are aligned towards each other and they both speak in that time interval. This approach can naturally be applied to detect one-to-many and many-to-many conversation scenarios. Using the audio channel, the egocentric system 300 can furthermore record the duration spoken for each participant, and thus identify dominant or passive participants in discussions during the meeting. For example, a dominant participant may speak more often to more people, speak louder, and/or speak longer than other viewers. Additional cues such as more physical activities that are sensed by the HMDs IMU and/or more viewing activities in the direction of other people (vs. the projection screen) can also be used to determine the role of the viewers.

In some implementations, from location and orientation information, the egocentric tracking system 300 can measure slide viewing activities, such as the amount of time each participants looked at a visual marker (e.g., a particular slide). Using the audio channel, the egocentric tracking system 300 can also infer the activity level of the discussion of the particular slide. This information can then be evaluated on a personal level, e.g., used to provide per-participant information on how long each slide was watched and to how much commentary was given by a user for each slide. Lastly, orientation information available directly from the HMD, or as inferred from the visual markers captured by a use's HMD, can be used to further infer whether a user is viewing the presented information on a global display (e.g., looking ahead at a projection screen or large display) or on his or her local device (e.g., looking down at laptop, smartphone, etc.).

In some implementations, using the inferred personalized viewing activities, the egocentric tracking system 300 can provide additional first-person video feeds for automated meeting summaries. For example, the HMDs camera can be used to provide additional video feeds for automated, video-based meeting summary generation. The first-person views provided by the cameras on the HMDs worn by the meeting participants can be used to provide more engaging cuts for video meeting summaries. For example, based on the viewing activities, cuts to view of person speaking, view of conversation partners for a prolonged conversation, alternating views between audience and speaker if the presentation becomes interactive, and/or common screen content if a majority of the audience is engaged in viewing it.

In some implementations, as shown in FIG. 1 and FIG. 2, fiducials are displayed on digital displays present in the meeting space. Fiducials not only facilitate tracking the user's position, but when displayed dynamically (e.g., changing with the content on the display), they can be used to show user-personalized content on the HMD. For example, business-oriented participants can be shown relevant business data, and engineers can be shown technical information related to the content shown on the main digital display. Furthermore, dynamically-displayed fiducials can be used to aid the generation of personal meeting summaries by keeping track of the times the displayed content on the digital displays is viewed by the user (assuming a steady head gaze in the direction of the content on the digital display constitutes a viewing by the user).

Conventional methods focus on localization using visual markers that require a significant amount of instrumentation. The advantage of current solutions is that smart spaces require less instrumentation in terms of sensors, as the users bring their own sensing to the space. As described above, this guarantees a certain amount of scalabilities, especially for large spaces, which would otherwise have to be instrumented by many sensors. Another advantage of using visual markers is that the visual markers configured in accordance with some implementation are scale-invariant, and can thus be used on a large scale in very large spaces, such as stadiums or exhibition halls. In addition, using the HMD for speaker localization is simpler and more robust than relying on sensors with such capabilities in the space, especially in large spaces where distances are greater than the capabilities of direction audio hardware.

Figure 7A:
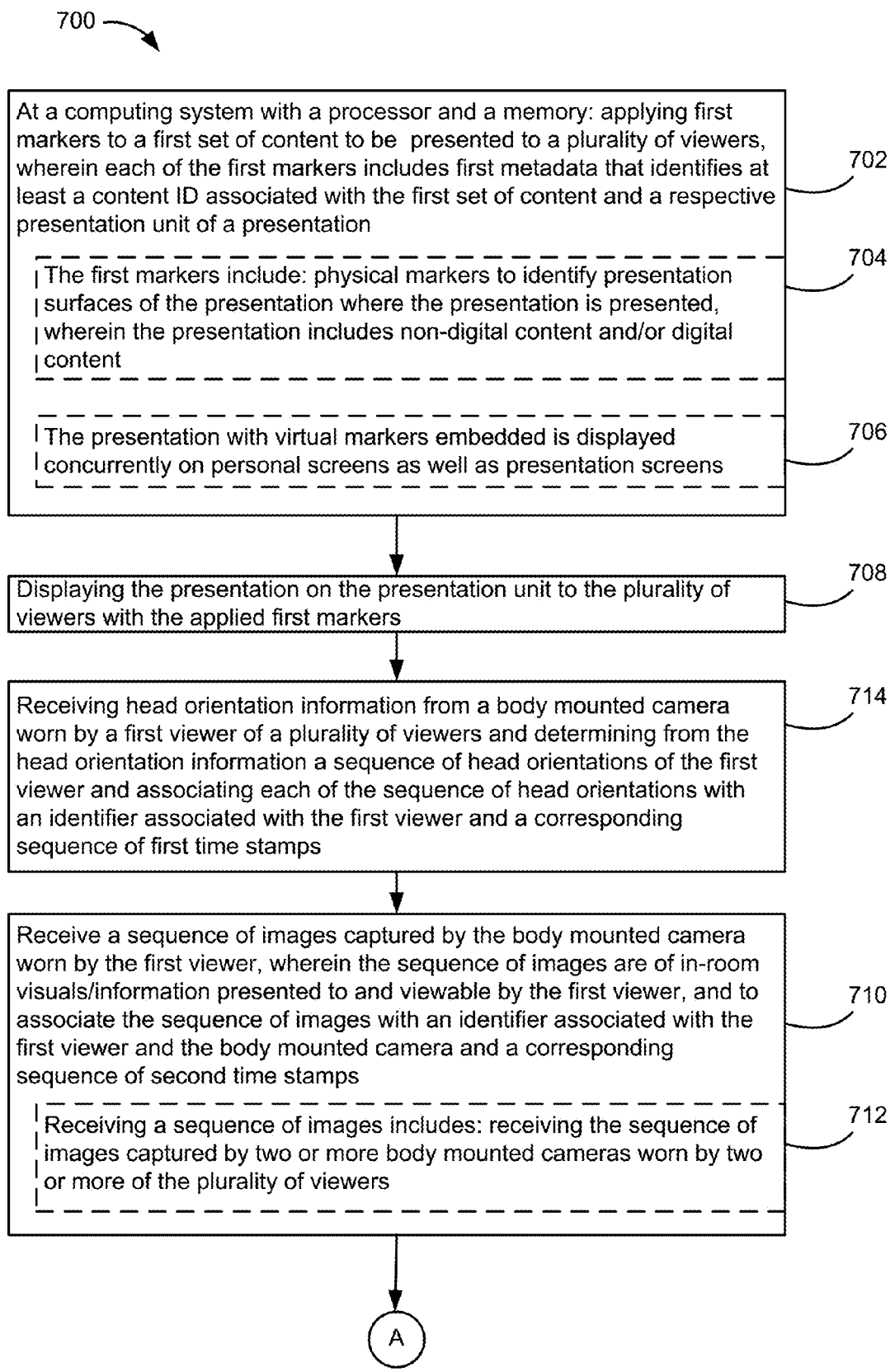
FIGS. 7A-7C illustrate a flow diagram of a method to determine viewer attention to presented content in smart spaces in accordance with some implementations.
Figure 7B:
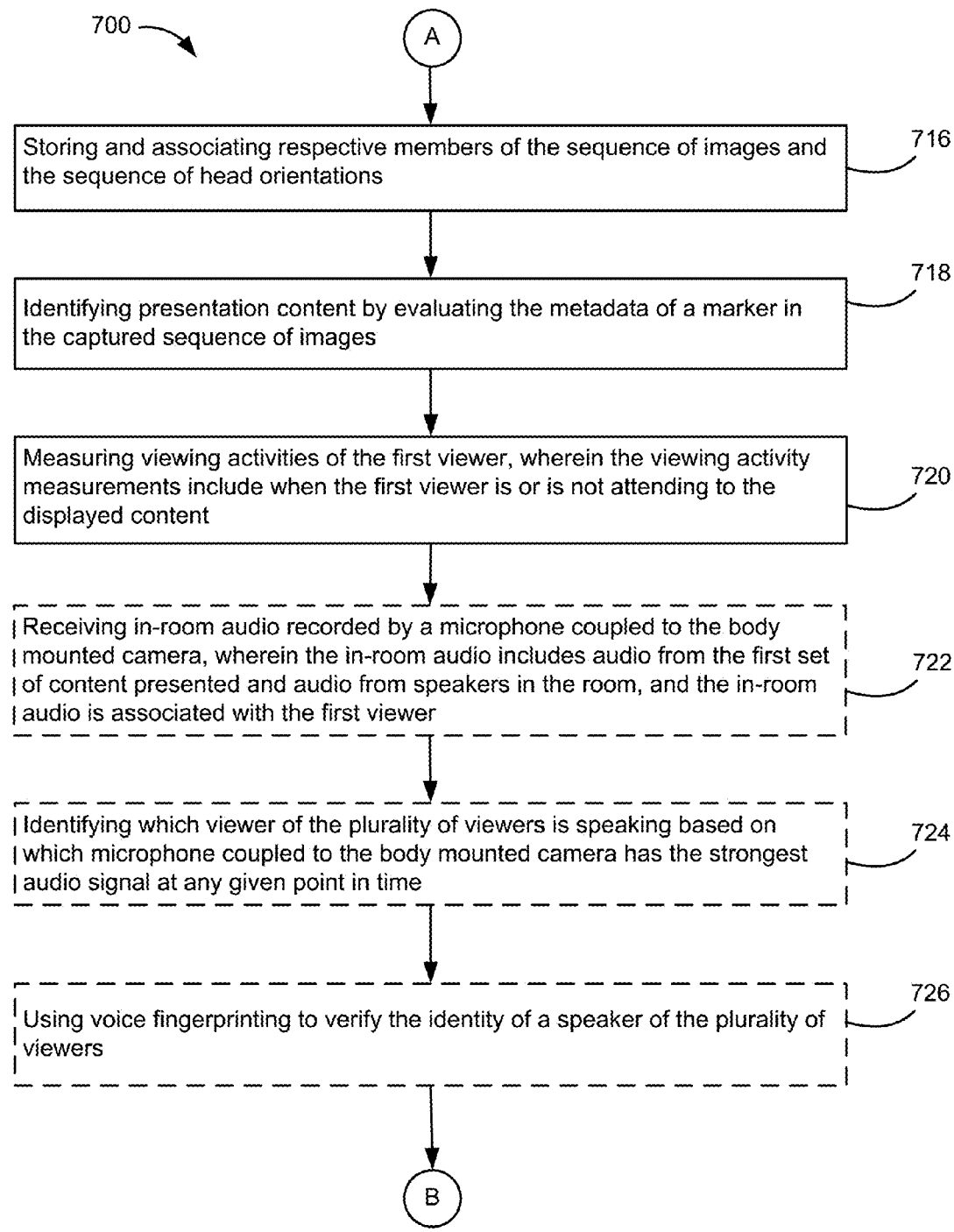
Figure 7C:
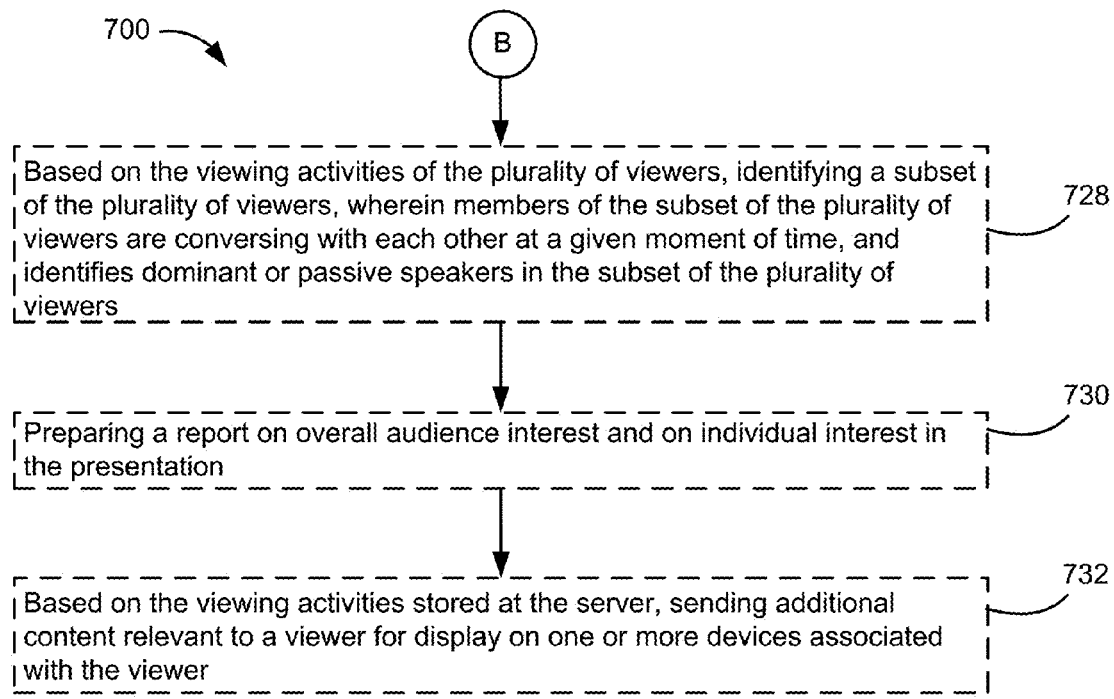

FIG. 7 illustrates a flow diagram of a method 700 for personalized event capture using egocentric tracking in smart spaces in accordance with some implementations. In some implementations, the method 700 is performed at a computer system (e.g., the server 320 in the egocentric tracking system 300) with one or more processors (e.g., the CPU 512) and memory (e.g., the memory 506) storing instructions for execution by the processor (e.g., the CPU 512).

The visual labeling module 520 applies (702) first markers to a first set of content to be presented to a plurality of users. In some implementations, each of the first markers includes first metadata that identifies at least a content ID associated with the first set of content and a respective presentation unit of a presentation. In some implementations, the first markers include (704) physical markers to identify presentation surfaces of the presentation (e.g., the white/chalk board 210, projection screen 220) where the presentation is presented. In some implementations, the presentation includes non-digital content (e.g., writings on the white/chalk board 210) and/or digital content (e.g., content embedded in the presentation). In some implementations, the presentation with virtual markers embedded is (706) displayed concurrently on personal screens as well as presentation screens.

For example, in FIG. 2 and FIG. 3, the content in the presentation can be displayed both on the projection screens 220, 304 and on the monitors 230, 308, so that attention of the users on supplementary content displayed on their computing devices 230, 308, in addition to or instead of the primary content displayed on the projection screens 220, 304 can be evaluated. Also, in some implementations, the markers on personal screens (e.g., the monitors of computing devices 230, 308) can be used for primary presentations viewed remotely for training, webinars, etc.

In some implementations, the attributes of content including the content ID and the metadata are stored in the content database 322 on the server 320 along with the content. After the visual labeling module 520 associates the content ID and the metadata with the content, the server 320 retrieves the content from the content database 322 and transmits the content to the plurality of users along with the content attributes. The display module 522 displays (708) the presentation on the presentation unit to the plurality of users with the applied first markers. In some implementations, another computing device, such as an in-room projector and/or a laptop receives the presentation data with the applied first markers via the communication network 328 from the server 320 and displays the presentation with the applied first markers on the presentation unit, e.g., the projection screens 304, 220 and/or the monitors 230, 308.

After the presentation content is displayed, the head orientation determining module 524 receives (710) head orientation information from a body mounted camera worn by a first viewer of a plurality of viewers and determines from the head orientation information a sequence of head orientations of the first viewer and associating each of the sequence of head orientations with an identifier associated with the first viewer and a corresponding sequence of first time stamps. In addition, the image receiving module 526 receives (710) a sequence of images captured by the body mounted camera worn by the first viewer. In some implementations, the sequence of images are of in-room visuals/information presented to and viewable by the first viewer, and to associate the sequence of images with an identifier associated with the first user and the body mounted camera and a corresponding sequence of second time stamps.

In some implementations, as shown in FIG. 3 and FIG. 4, the camera is head mounted as part of the client device 306 (e.g., Google Glass) so that the first-person view of the presentation content and the head orientation are captured by the camera for egocentric tracking. In some other implementations, eye tracking and/or gaze tracking can be used instead of or in addition to the head mounted client device 306 to capture the location and orientation of the user attention during the presentation with timestamps. The server 320 can then combine the presentation content information including timestamps with the gaze/eye tracking information, the user information, the device information, and/or the smart spaces information (e.g., location and geometry of markers) to infer the viewing activities of the users.

In some implementations, receiving a sequence of images includes (712) receiving the sequence of images captured by two or more body mounted cameras worn by two or more of the plurality of users. For example, in a meeting that is attended by more than one users, as shown in FIG. 3, each user 320 wears a head mounted device 306 to capture the first-person view of the presentation content. The captured images are then transmitted to the server 320 via the communication networks 328 for further analysis.

Once the server 320 receives the images and the head orientation from the client devices 306, the data integration module 528 stores (716) and associates respective members of the sequence of images and the sequence of head orientations. The content identification module 530 further identifies (718) presentation content by evaluating the metadata of a marker in the captured sequence of images. In addition, the viewer attention module 532 measures (720) viewing activities of the first viewer, wherein the viewing activity measurements include when the first viewer is or is not attending to the displayed content.

For example, the server 320 analyzes the images and the head orientations associated with each viewer after receiving the image and head orientations from the client device 306. Upon detection of markers in the images, the server 320 identifies metadata of the markers. In some implementations, the server 320 queries the content database 546 to retrieve the metadata based on the content ID. Combining with the head orientation information, the viewer attention module 532 can measure whether the user was paying attention to the presented content, the portion of the content the user was paying attention to, and/or the duration of viewing activities.

In addition to visual input, the server 320 also uses audio input for egocentric tracking in smart spaces. In some implementations, the audio receiving module 534 receives (722) in-room audio recorded by a microphone (e.g., the audio input device 409) coupled to the body mounted camera. In some implementations, the in-room audio includes audio from the first set of content presented and audio from speakers in the room, and the in-room audio is associated with the first viewer. In some implementations, after receiving the audio, the speaker identification module 536 identifies (724) which viewer of the plurality of viewers is speaking based on which microphone coupled to the body mounted camera has the strongest audio signal at any given point in time. In some implementations, the speaker authentication module 538 uses (726) voice fingerprinting to verify the identity of a speaker of the plurality of viewers. When there are more than one viewers, based on the viewing activities of the plurality of viewers, the discussion dynamic determination module 540 identifies (728) a subset of the plurality of viewers. In some implementations, members of the subset of the plurality of viewers identified are conversing with each other at a given moment of time, and identifies dominant or passive speakers in the subset of the plurality of viewers.

For example, in FIG. 3, when the presenter 302-N is presenting content displayed on the projection screen 304 and the computing device 308, the audio input device 409 of the head mounted device 306-N records in-room audio. The in-room audio can include both the presenter's 302-N explanation of the presentation content and audio from the presentation content broadcasted by, e.g., one or more speakers in the smart spaces. In some implementations, the client device's 306 audio input device 409 (e.g., an on-board microphone) can detect and measure the volume amplitude in the appropriate frequency range to differentiate the speaker's voice and the audio from the presentation content broadcast. Similarly, when a plurality of users 302 in the smart space are equipped with voice input devices, the audio input devices 409 can record the audio from multiple users and transmit the audio to the server 320. Upon receiving the audio input from multiple client devices 306, the server 320 can compare the volume amplitudes to identify that the microphone coupled to the client device 306-N has the strongest audio signal at a given time.

In order to identify the speaker, in some implementations, the audio information along with timestamps is stored in the viewing activities database 552. Combining the information stored in device database 548 and the user database, the speaker identification module 536 and the speaker authentication module can associate the audio input device 409 with the client device 306 and further associate with the user 302 wearing the client device 306. Continuing the above example, upon identifying that the microphone coupled to the client device 306-N has the strongest audio signal at a given time, the speaker identification module 536 can query the device database 548 and the user database 550 to identify that the user 302-N is the presenter speaker at a given time.

In a similar vein, at a different given time, when the user 302-1 raises a question, the audio receiving module 534 receives the audio data from the client device 306-1 via the communication networks 328. The speaker identification module 536 then queries the device database 548 and the user database 550 to identify that the user 302-1 is the speaker at this given time. Additionally, when the user 302-1 engages in further discussion with the presenter and/or other viewers 302-2 etc., the audio receiving module 534 receives the audio data from multiple client devices 306 via the communication networks 328. The speaker identification module 536 then queries the device database 548 and the user database 550 to identify that the user 302-1 is the speaker at a given time in the discussion. Based on data stored in the viewing activities database 552 including the audio data, the discussion dynamics determination module 540 can identify which viewers are conversing with each other at a given time during the discussion and identify dominant or passive speakers based on the amplitude of the audio signals.

In some implementations, security is built into the system (e.g., in in-room or server side components) to dispense with the need for a separate authentication system. For example, using voice fingerprinting, the speaker authentication module 538 and/or the speaker identification module 536 can verify the identity of the speaker wearing a head mounted device and verify the presence of a participant at a meeting. In some implementations, the signature resulting from the voice fingerprinting operation is stored in the device database 548 and/or the user database 550 for subsequent matching and identification of user. In some implementations, the speaker identification and authentication function are performed on the client device 306 using the information stored in the user data 432 and/or the device data 434 and/or the timestamps 436. For example, the device 306 can be used by one user in one meeting scheduled for the morning, while the same device 306 can be used by a different user in a different meeting scheduled for the afternoon. Using voice fingerprinting, a user who uses the device 306 at the wrong meeting can be alerted upon a failed authentication in accordance with some implementations.

In some implementations, the reporting module 542 prepares (730) a report on overall audience interest and on individual interest in the presentation. For example, automated video-based meeting summary can be generated by the reporting module 542. In the meeting summary, clips from the first-person view captured by the head mounted device 306 can be used to highlight portions of content the viewers are interested in the most. In some implementations, based on the viewing activities stored at the server in the viewing activities database, the additional video feeds module 544 sends additional content relevant to a viewer for display on one or more devices associated with the viewer (e.g., the presentation screen 304, the computing device 308, and/or the head mounted device 306).

For example, after the same set of slides is presented to different groups, based on the viewing activities analysis using information stored in the viewing activities database 552, the user database 550, the device database 548, and the content database 546, the report module 542 generates a report showing group A is more interested in the first few slides, while group B is more interested in the last few slides. Based on the report, the additional video feeds module 544 sends additional content relevant to the first few slides to group A and additional content relevant to the last few slides to group B. Group A can then view the customized content on the projection screens, monitors, and/or the head mounted devices associated with group A; group B can then view the customized content on the projection screens, monitors, and/or the head mounted devices associated with group B. Thus, systems and methods in accordance with some implementations use egocentric tracking for user localization to enable the personalized capturing of meeting events.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference has been made in detail to various implementations, examples of which are illustrated in the accompanying drawings. In the preceding detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A system to determine viewer attention to presented content, comprising:
one or more processors; and
memory storing one or more programs to be executed by the one or more processors, the one or more programs comprising instructions for:
applying first markers to a first set of content to be presented to a plurality of viewers, wherein each of the first markers includes first metadata that identifies at least a content ID associated with the first set of content and a respective presentation unit of a presentation;
displaying the presentation on the presentation unit to the plurality of viewers with the applied first markers;
receiving head orientation information from a body mounted camera worn by a first viewer of a plurality of viewers and determining from the head orientation information a sequence of head orientations of the first viewer and associating each of the sequence of head orientations with an identifier associated with the first viewer and a corresponding sequence of first time stamps;
receiving a sequence of images captured by the body mounted camera worn by the first viewer, wherein the sequence of images are of in-room visuals/ information presented to and viewable by the first viewer, and to associate the sequence of images with an identifier associated with the first viewer and the body mounted camera and a corresponding sequence of second time stamps;
storing and associating respective members of the sequence of images and the sequence of head orientations;
identifying presentation content by evaluating the metadata of a marker in the captured sequence of images; and
measuring viewing activities of the first viewer, wherein the viewing activity measurements include when the first viewer is or is not attending to the displayed content.

2. The system of claim 1, wherein the first markers include:
physical markers to identify presentation surfaces of the presentation where the presentation is presented, wherein the presentation includes non-digital content and/or digital content.

3. The system of claim 1, wherein the presentation with virtual markers embedded is displayed concurrently on personal screens as well as presentation screens.

4. The system of claim 1, wherein the image receiving module receives the sequence of images captured by two or more body mounted cameras worn by two or more of the plurality of viewers.

5. The system of claim 1, wherein the one or more programs further comprise instructions for:
receiving in-room audio recorded by a microphone coupled to the body mounted camera, wherein the in-room audio includes audio from the first set of content presented and audio from speakers in the room, and the in-room audio is associated with the first viewer.

6. The system of claim 1, wherein the one or more programs further comprise instructions for:
identifying which viewer of the plurality of viewers is speaking based on which microphone coupled to the body mounted camera has the strongest audio signal at any given point in time.

7. The system of claim 1, wherein the one or more programs further comprise instructions for:
using voice fingerprinting to verify the identity of a speaker of the plurality of viewers.

8. The system of claim 1, wherein the one or more programs further comprise instructions for:
based on the viewing activities of the plurality of viewers, identifying a subset of the plurality of viewers, wherein members of the subset of the plurality of viewers are conversing with each other at a given moment of time, and identifies dominant or passive speakers in the subset of the plurality of viewers.

9. The system of claim 1, wherein the one or more programs further comprise instructions for:
preparing a report on overall audience interest and on individual interest in the presentation.

10. The system of claim 1, wherein the one or more programs further comprise instructions for:
based on the viewing activities stored at the system, sending additional content relevant to a viewer for display on one or more devices associated with the viewer.

11. A method to determine viewer attention to presented content, comprising:
at a computer system with a processor and a memory:
applying first markers to a first set of content to be presented to a plurality of viewers, wherein each of the first markers includes first metadata that identifies at least a content ID associated with the first set of content and a respective presentation unit of a presentation;
displaying the presentation on the presentation unit to the plurality of viewers with the applied first markers;
receiving head orientation information from a body mounted camera worn by a first viewer of a plurality of viewers and determining from the head orientation information a sequence of head orientations of the first viewer and associating each of the sequence of head orientations with an identifier associated with the first viewer and a corresponding sequence of first time stamps;
receiving a sequence of images captured by the body mounted camera worn by the first viewer, wherein the sequence of images are of in-room visuals/ information presented to and viewable by the first viewer, and to associate the sequence of images with an identifier associated with the first viewer and the body mounted camera and a corresponding sequence of second time stamps;
storing and associating respective members of the sequence of images and the sequence of head orientations;
identifying presentation content by evaluating the metadata of a marker in the captured sequence of images; and measuring viewing activities of the first viewer, wherein the viewing activity measurements include when the first viewer is or is not attending to the displayed content.

12. The method of claim 11, wherein measuring the viewing activities of the first viewer further comprises:
for each of a plurality of times, wherein the respective members of the sequence of images and the sequence of head orientations are associated at the plurality of times based on the first and second timestamps:
 computing a difference of direction between the sequence of head orientations and a relative position of the identified content in the sequence of images; and
 determining that the first viewer is attending to the identified content when the difference of direction is within a predefined angular difference at the respective time.

13. The method of claim 11, wherein the first markers include:
physical markers to identify presentation surfaces of the presentation where the presentation is presented, wherein the presentation includes non-digital content and/or digital content.

14. The method of claim 11, wherein the presentation with virtual markers embedded is displayed concurrently on personal screens as well as presentation screens.

15. The method of claim 11, wherein receiving a sequence of images includes: receiving the sequence of images captured by two or more body mounted cameras worn by two or more of the plurality of viewers.

16. The method of claim 11, further comprising:
receiving in-room audio recorded by a microphone coupled to the body mounted camera, wherein the in-room audio includes audio from the first set of content presented and audio from speakers in the room, and the in-room audio is associated with the first viewer.

17. The method of claim 11, further comprising:
identifying which viewer of the plurality of viewers is speaking based on which microphone coupled to the body mounted camera has an audio signal that is strongest at any given point in time.

18. The method of claim 11, further comprising:
based on the viewing activities of the plurality of viewers, identifying a subset of the plurality of viewers, wherein members of the subset of the plurality of viewers are conversing with each other at a given moment of time, and identifies dominant or passive speakers in the subset of the plurality of viewers.

19. The method of claim 11, further comprising:
based on the viewing activities stored at the computer system, sending additional content relevant to a viewer for display on one or more devices associated with the viewer.

20. A non-transitory computer readable storage medium storing one or more programs to be executed by a computer system with memory, and one or more processors, the one or more programs comprising:
instructions for applying first markers to a first set of content to be presented to a plurality of viewers, wherein each of the first markers includes first metadata that identifies at least a content ID associated with the first set of content and a respective presentation unit of a presentation;
instructions for displaying the presentation on the presentation unit to the plurality of viewers with the applied first markers;
instructions for receiving head orientation information from a body mounted camera worn by a first viewer of a plurality of viewers and determining from the head orientation information a sequence of head orientations of the first viewer and associating each of the sequence of head orientations with an identifier associated with the first viewer and a corresponding sequence of first time stamps;
instructions for receiving a sequence of images captured by the body mounted camera worn by the first viewer, wherein the sequence of images are of in-room visuals/information presented to and viewable by the first viewer, and to associate the sequence of images with an identifier associated with the first viewer and the body mounted camera and a corresponding sequence of second time stamps;
instructions for storing and associating respective members of the sequence of images and the sequence of head orientations;
instructions for identifying presentation content by evaluating the metadata of a marker in the captured sequence of images; and
instructions for measuring viewing activities of the first viewer, wherein the viewing activity measurements include when the first viewer is or is not attending to the displayed content.

* * * * *